June 21, 1955 S. A. SZYMCZAK 2,711,125
COMBINED MOLDBOARD PLOW AND SOIL PULVERIZER
Filed June 25, 1951 2 Sheets-Sheet 1

INVENTOR
STANLEY A. SZYMCZAK

BY *Young & Wright*

ATTORNEYS

June 21, 1955 S. A. SZYMCZAK 2,711,125
COMBINED MOLDBOARD PLOW AND SOIL PULVERIZER
Filed June 25, 1951 2 Sheets-Sheet 2
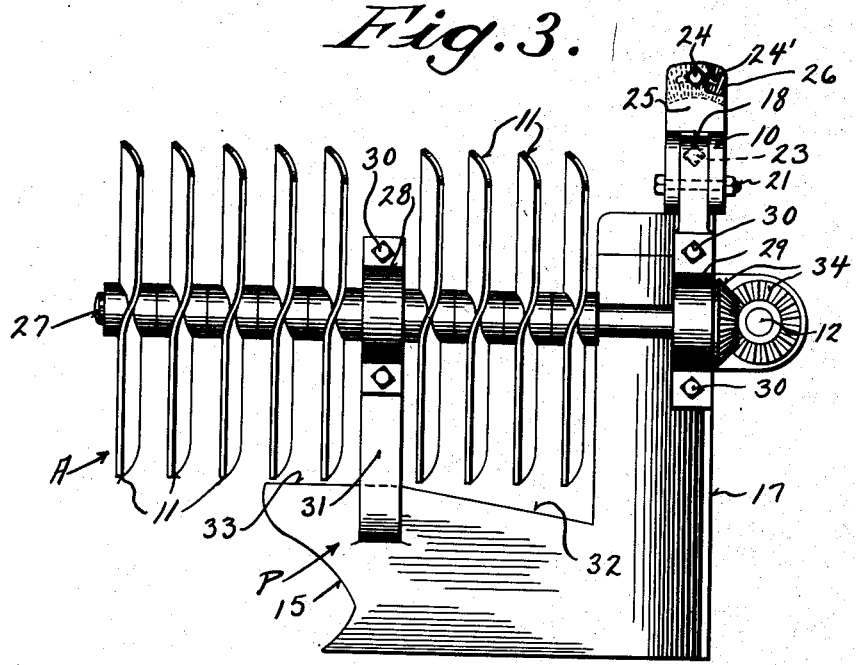
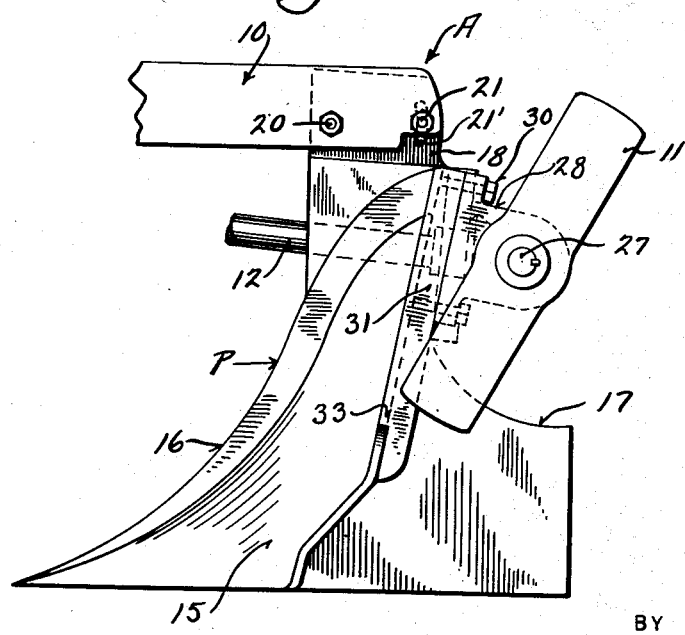
INVENTOR
STANLEY A. SZYMCZAK
BY
ATTORNEYS

United States Patent Office 2,711,125
Patented June 21, 1955

2,711,125

COMBINED MOLDBOARD PLOW AND SOIL PULVERIZER

Stanley A. Szymczak, Milwaukee, Wis.

Application June 25, 1951, Serial No. 233,369

1 Claim. (Cl. 97—35)

My invention appertains to plows and more particularly to a plow apparatus which will lift and break the ground at one operation.

Heretofore when it has been desired to break loam or pulverize the earth turned by a plow, it has been necessary to utilize a drag or harrow. Some attempts have been made to provide attachments for plows to act as loam breakers, etc., but these separate attachments have not been well designed, and are usually complicated, cumbersome and must always be separately adjusted and aligned properly with the plow.

One of the primary objects of my invention is to provide a plow apparatus which will not only lift the soil slice in the usual manner, but will break and pulverize the earth moving on the rear of the moldboard into fine fragments, thus eliminating the necessity of utilizing a drag, harrow and other plow attachments.

Another object of my invention is to recess or slot the rear portion of the moldboard of my plow to receive the rotatable cutting and pulverizing blades.

A further object of my invention is to extend my rotatable cutting and pulverizing blades transversely across the rear of the moldboard and outwardly therefrom.

A more specific object of my invention is to form my rotatable cutting and pulverizing blades as part of my plow apparatus, so that any angular or tilting adjustment of the plow body will automatically be transmitted to the cutting and pulverizing blades.

A still further object of my invention is to provide a simple, practical and reliable construction that is economical to manufacture, easy to assemble and positive in its operation.

With the above and other objects in view, which will more readily appear as the nature of my invention is better understood, the same consists in the novel construction, combination and arrangement of parts hereinafter more fully described, illustrated and claimed.

One preferred and practical embodiment of the invention is shown in the accompanying drawings, in which:

Figure 3 is a rear elevational view; and

Figure 4 is a fragmentary side elevational view taken on the moldboard side of the plow.

Referring to the drawings in detail, wherein similar reference characters designate corresponding parts throughout the several views, the letter A generally indicates one type of my improved plow apparatus.

Figure 1:
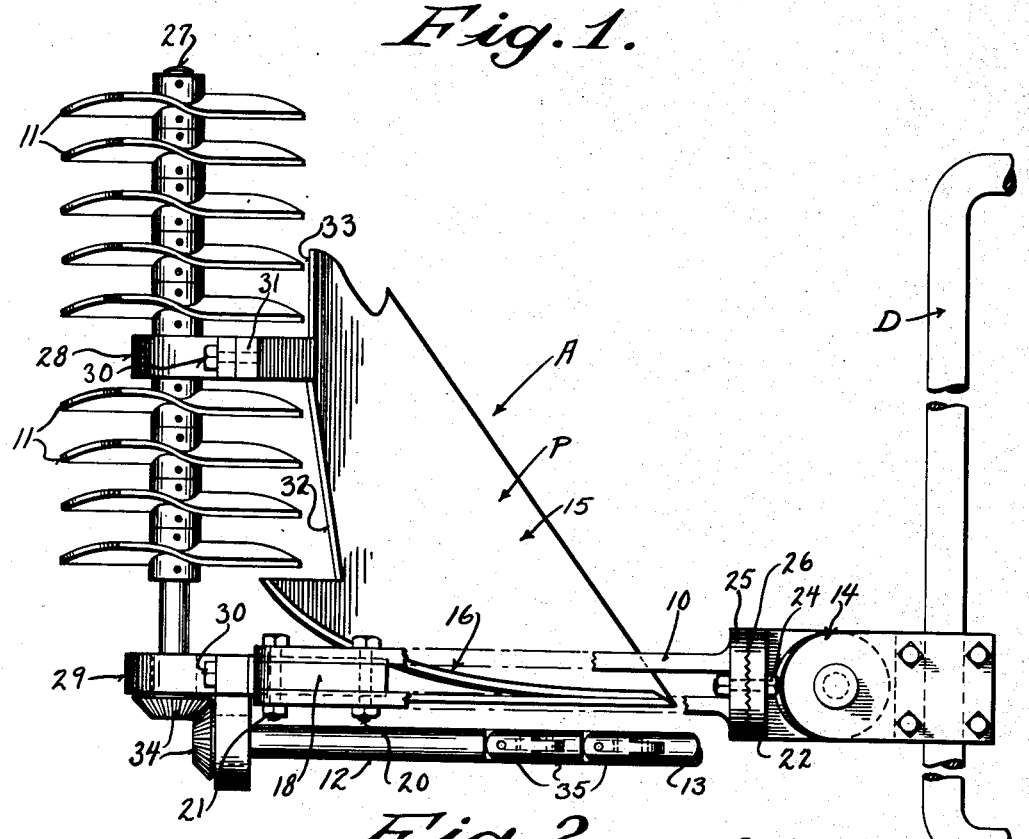
Figure 1 is a top plan view showing my plow apparatus attached to the drawbar of a tractor.
Figure 2:
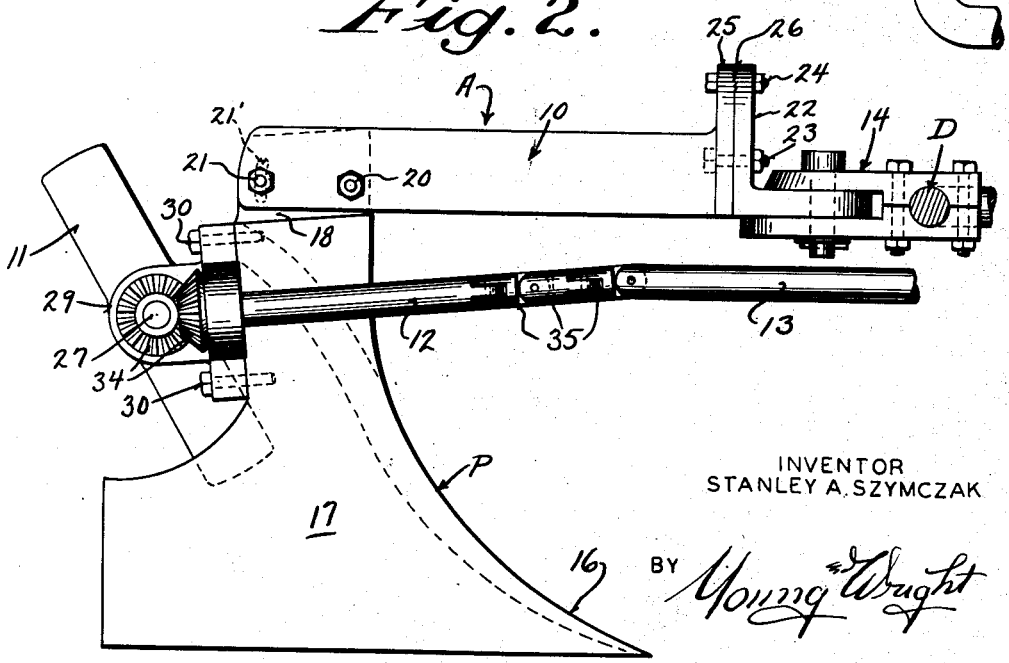
Figure 2 is a side elevational view of my plow apparatus, the view being taken on the land side of the plow.

The plow apparatus A includes broadly the plow body P, plow beam 10, rotatable cutting and pulverizing blades 11 and the right angularly extending drive shaft 12 which is universally coupled to a driven shaft 13. The plow beam is adjustably and pivotally secured to the drawbar B of the tractor by means of the coupling 14, and the driven shaft 13 is suitably connected to the power take-off (not shown) of the tractor.

As illustrated, the plow P may be of any standard type, and includes the moldboard 15, cutting edge or plowshare 16 and the land side of the plow 17. The head 18 of the plow is adjustably secured to the plow beam 10 by means of a pivot bolt 20 and a rear bolt 21. Pivot bolt 20 and the bolt 21 extend through both plates of the plow beam 10 and through the head 18 of the plow. The rear portion of the plow head 18 is provided with an elongated vertically extending slot 21' through which the rear bolt 21 passes. By loosening the nut on bolt 21 and pivoting the plow about bolt 20, the cutting angle of the plow may be readily adjusted. It should be observed at this time that the plow may also be tilted about its longitudinal axis and this is accomplished by adjustably securing the plow beam 10 to the angle member 22 which is in turn pivotally connected to the coupling 14. The angle member 22 is fastened to the plow beam by two bolts 23 and 24 which pass through the upright end 25 of the plow beam 10 and angle member 22. Upper bolt 24 is received in arcuate slots 24' formed on the upper ends 25 of the plow beam 10 and member 22. In order to hold the plow in its adjusted position, the inner juxtaposed faces of member 22 and 25 are provided with interlocking grooves or teeth 26.

The cutting and pulverizing blades 11 are rigidly splined to a rotatable shaft 27 which extends transversely across the upper rear portion of the plow moldboard 15. The shaft 27 is rotatably mounted in the bearings 28 and 29. Bearing 29 is secured by means of bolts 30 to the rear surface of the plow head 18 and bearing 28 is secured to the reinforced section 31 of the moldboard 15.

In order to facilitate the proper breaking and pulverizing of the soil slice the moldboard 15 is recessed or slotted at 32 and 33, and the ends of the cutting blades 11 extend into these slots or recesses. While the blades 11 are shown as being mounted aligned and parallel on the shaft 27, it is obvious that if desired they may be arranged in any manner, such as a spiral, etc.

Rotatable shaft 27 is connected to the drive shaft 12 by beveled gears 34 and, as stated above, drive shaft 12 is universally secured to the driven shaft 13. The universal joint may be of any standard type, and in the present instance it consists of a series of knuckle joint 35.

In utilizing my plow apparatus, the cutting edge 16 of the plow P is adjusted to the desired angle and the proper tilt is given to the plow. The soil slice moves upwardly and rearwardly on the moldboard 15 and comes in contact with the rotating, cutting and pulverizing blades 11. These blades then pick up the earth or loam and thoroughly break it into fine fragments. In the event that the desired cutting angle is a deep one and the soil slice extends transversely beyond the moldboard 15, the outer blades 11' will then function to break that portion of the soil slice.

It is thus readily apparent that my plow apparatus will eliminate the need for a drag or harrow or the use of any cumbersome plow attachments which are necessary to pulverize or break the soil.

From the foregoing, it is believed that the features and advantages of my invention will be readily apparent to those skilled in the art, and it will, of course, be understood that changes in the form, proportion and minor details of construction may be resorted to without departing from the spirit of the invention or the scope of the appended claim.

I claim:

A plow apparatus including a plow having a cutting edge, an upper head member and an upwardly and rearwardly extending moldboard, a plow beam adjustably secured to the upper head member, means adjustably and pivotally securing said plow beam to the drawbar of a tractor, the upper portion of said moldboard being recessed and having an upwardly extending portion intermediate its ends, a shaft extending transversely across the upper moldboard portion of said plow and rotatably mounted in bearings secured to the upper head member and said upwardly extending portion of the moldboard, said shaft having a portion terminating substantially beyond the upper outer end of said moldboard, a right angularly extending drive shaft secured to said upper head member adjacent said first shaft and in beveled gear connection therewith, and a plurality of cutting and pulverizing blades rigidly splined to said first shaft for substantially its entire length, whereby the soil slice moving rearwardly on the moldboard and off the upper outer end thereof will be broken into fine fragments.

References Cited in the file of this patent

UNITED STATES PATENTS

| Number | Name | Date |
|---|---|---|
| 314,609 | Schenck | Mar. 31, 1885 |
| 1,113,684 | Phillips | Oct. 13, 1914 |
| 1,485,819 | Shields | Mar. 4, 1924 |
| 1,732,862 | Ross et al. | Oct. 22, 1929 |
| 2,058,140 | Dollase | Oct. 20, 1936 |
| 2,244,538 | Kasten | June 3, 1941 |